Nov. 17, 1959  J. H. WILSON  2,912,882
MULTI-SPEED TRANSMISSION CASES
Filed Nov. 26, 1956

INVENTOR.
John Hart Wilson
BY
Wayland D. Keith
HIS AGENT

United States Patent Office 2,912,882
Patented Nov. 17, 1959

2,912,882

MULTI-SPEED TRANSMISSION CASES

John Hart Wilson, Wichita Falls, Tex.

Application November 26, 1956, Serial No. 624,307

4 Claims. (Cl. 74—611)

This invention relates to improvements in transmission units, and more particularly to multi-speed transmission unit cases used with rotary well drilling equipment.

Various transmission cases have been proposed heretofore, but in general these were cast, or otherwise integrally made, which did not lend to lightness in weight, ready precision machining, and ease of assembly and disassembly. The present transmission case is so constructed as to meet these requirements, which is particularly advantageous when used with portable equipment, such as rotary well drilling machines.

An object of this invention is to provide a transmission case which is fabricated of welded steel, parts of which may be pre-machined to precision accuracy, prior to welding the assembly together.

Yet another object of the invention is to provide a welded steel, fabricated case of a type the transverse shafts of which, both input and output, may be moved upward vertically, by removal of a detachable section of the oil tight case, and by the removal of cap screws, without removing any sprockets or other parts from the transverse shafts.

With these objects in mind and others which will become manifest as the description proceeds, reference is to be had to the accompanying drawings, in which like reference characters designate like parts in the several views thereof, in which.

Figure 1:
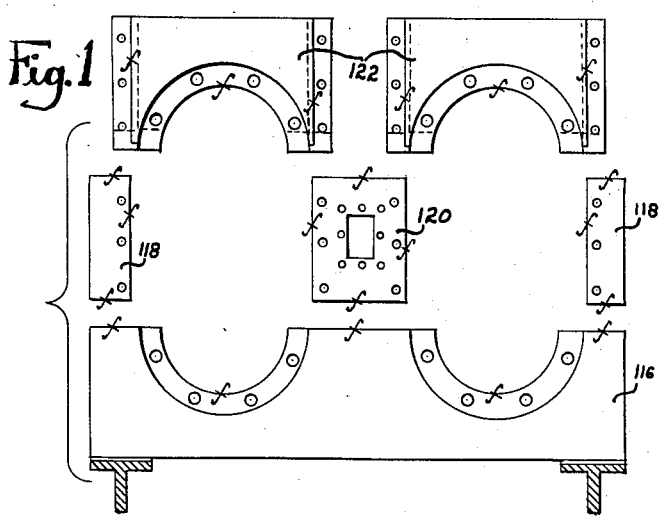
Fig. 1 is an exploded view of the side plate elements of the transmission case, prior to assembly.

With more detailed reference to the drawing, the numeral 117 designates generally a composite transmission case unit, which is so constructed that a multiplicity of such units may be fitted in side by side relation to surround at least two transverse shafts which pass therethrough.

The present transmission cases are constructed of fabricated plate material in such manner that precision accuracy may be had in the machining and assembly thereof. The transmission cases are fabricated to give ready access to the interior and at the same time are constructed in such manner, that the cases may be accurately machined before welding the component plate elements together and subsequently welding the plate elements together so that the finished product is readily assembled and disassembled.

Figure 3:
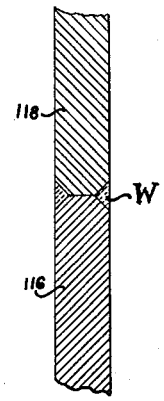
Fig. 3 is an enlarged, sectional view taken on the line 3—3 of Fig. 2, looking in the direction indicated by the arrows.
Figure 2:
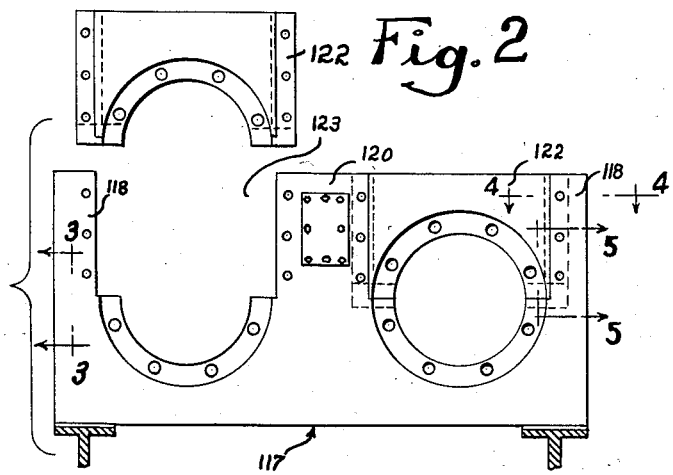
Fig. 2 is an assembled view of the transmission plate elements welded together and showing one sliding bearing retainer member in place, and showing one such bearing member in exploded relation with respect to the case.

Figs. 1 through 5 show detailed construction of the cases, and particular attention is directed to Figs. 1, 2 and 3, wherein side plate elements 116, 118, and 120 are usually from ⅜" to ¾" in thickness, and wherein the individual edges of each plate, indicated at *f* (italic) are finished to the exact assembly size by grinding, and after the plates are thus finished on the edges so marked, and the contours so indicated, they are placed in a precision jig and welded together in such manner as to present a uniform plate surface. This enables square, machine ground corners to be had at points where it would be impractical to machine after assembly.

By providing oil seal packing elements, such as O-ring strips 124 between detachable plate elements 122 and the adjacent surface of plates 118 and 120 of the transmission case 117, an oil tight juncture may be had. After the detachable plate elements 122 are fitted into the respective notches 123, the transmission case 117 is machined to form round holes, each of which holes is to receive a flange type bearing housing in the wall of the transmission case. The detachable, interfitting slide plate elements 122 are fitted within the recesses 125 in such manner as to be oil tight, and yet be readily removable from the case, by removing a few cap screws. After the plate elements 122 are fitted into the respective notches 123, circumferentially spaced holes are drilled in the case around the round holes formed therein.

The construction of the case, as described above, and as shown in Fig. 1 through 5, is such that two detachable slide plate elements 122 are provided, which hold the bearings of each transverse shaft in place, so by removing a few cap screws, the slide elements and shafts may be readily removed without the disassembly of the sprockets and bearing elements thereon.

The vertical sealing strip 125 overlaps the joint between the plates 118 and 122 on one side of the case and between plates 118 and 120 on the opposite side thereof, and with the strip 125 being welded to the detachable slide plate elements 122, these detachable slide plate elements 122 may be fastened in place with cap screws, with the O-ring strip 124 being within a groove in strip 125 so as to provide an oil tight seal between the strips 125 and the respective plates 118 and 120.

Figure 5:
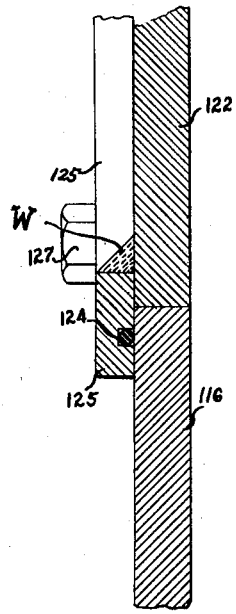
Fig. 5 is a fragmentary, sectional view of the transmission case joint structure.
Figure 4:
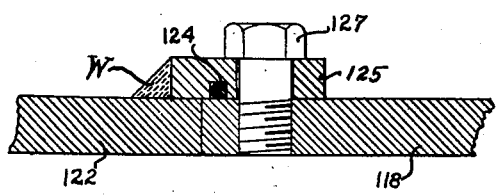
Fig. 4 is an enlarged, sectional view taken on the line 4—4 of Fig. 2, looking in the direction indicated by the arrows.

The strip 125 overlaps the horizontal joint between plates 116 and 122 in such manner as to cause a gravity seal, as best seen in Fig. 5, so that the oil in the case which runs down strips 125 will drop off at the outer side, and not run out through the horizontal joint between the slide elements 122 and plate 116.

It is to be pointed out that case 117 is representative of the construction of the transmission cases used on the outsides, when three or more cases are positioned on transverse shafts, which cases are of the same general construction, with shaft supporting bearings mounted in the outer walls thereof.

The construction described above, gives unusual accuracy and enables ready assembly, without the usual misfit of bearing members and misalignment of shafts, that is inherent in such cases, which are not accurately made up, but at the same time a case is provided that is relatively light in weight, in view of the heavy duty it performs, thereby enabling a substantial saving in material.

While the above construction and assembly has been described in some detail for a particular case, it is to be understood that changes may be made in the minor details of construction and adaptations made to different installations without departing from the spirit of the invention or the scope of the appended claims.

Having thus described the invention, what is claimed is:

1. A transmission case structure forming a housing for power transmission gears and the like; which case has a side wall with at least one notch formed therein, the lower portion of which notch is semi-circular in form and the upper portion of which notch has the sides thereof parallel for a length greater than the depth of said semi-circular portion of said notch, a complementary slide member having parallel sides adapted to fit into the upper portion of said notch in said side wall of said case in sliding relation, which slide member has a semi-circular notch formed therein in the lower side thereof, which notch is arranged in inverse relation with respect to said first mentioned notch, so when said slide member is fitted within the upper portion of said notch, said semi-circular notches will form a round opening in said case to receive a bearing therein, said side wall having bolt holes formed therein adjacent to said notch, and said slide member having bolt holes formed therein, which holes are adapted to register with the holes in said case, when said slide member is fitted in the upper portion of said notch to form a tight fit about a bearing when in fitted together relation.

2. A transmission case structure forming a housing for power transmission gears and the like, which case has side walls on opposite sides thereof, said side walls having notches formed therein, so as to lie in a plane perpendicular to said side walls and in aligned relation, the lower portion of said notches being semi-circular in form and the upper portion thereof having parallel sides for a length greater than the depth of said semi-circular portion of said notches, complementary slide members, each having parallel sides, adapted to fit into the upper portion of said respective notches in said side walls of said case in sliding relation, which slide members have semi-circular notches formed therein in the lower side thereof, which notches in said slide members are arranged in inverse relation with respect to the notches in the respective side walls, so when slide members are fitted into the upper portion of said respective notches, said semi-circular portions of said notches in the lower portion of the respective slide members and the semi-circular portions of the notches formed in the respective side walls will cooperate to form round openings in the respective side walls to receive a shaft therethrough, which shaft has at least two bearings thereon, said side walls each having bolt holes formed therein adjacent the respective notches, said slide members having bolt holes formed therein on the outer sides thereof, which holes will register with the bolt holes in said side walls to enable bolts to pass therethrough to secure said slide members in place, so said openings formed therebetween will each form a seat for a bearing in such manner that the joint between the side wall and the bearing is substantially fluid tight.

3. A transmission case as defined in claim 1, wherein said slide member has an elongated, off-set portion fitted along the length of a side thereof to complementally engage the side wall of said case in over-lapping relation, so said slide member and said side wall of said case, when fitted together, will lie in the same plane and form a tight joint when bolted together.

4. A transmission case as defined in claim 3, wherein said elongated, off-set portion of said slide member, which engages said side wall to form an over-lapping member, has a groove formed therein substantially throughout the length thereof, and wherein a linear sealing element is fitted within said groove in close fitting relation and against a side of said side wall of said case so as to form a fluid tight seal therebetween when said bolts secure said slide member to the side wall of said case.

References Cited in the file of this patent

UNITED STATES PATENTS

| | | |
|---|---|---|
| 648,377 | Cox | July 16, 1901 |
| 1,048,328 | Maize | Dec. 24, 1912 |
| 1,266,187 | Weiss | May 14, 1918 |
| 1,874,905 | Coffey | Aug. 30, 1932 |
| 1,903,120 | Lafferty | Mar. 28, 1933 |
| 2,309,285 | Walton | Jan. 26, 1943 |
| 2,634,619 | Picard | Apr. 14, 1953 |